(12) United States Patent
Hegner et al.

(10) Patent No.: US 6,770,377 B2
(45) Date of Patent: Aug. 3, 2004

(54) ACTIVE BRAZING SOLDER FOR BRAZING ALUMINA-CERAMIC PARTS

(75) Inventors: Frank Hegner, Lörrach (DE); Elke Maria Schmidt, Schopfheim (DE); Volker Güther, Sarrländer (DE); Anobecs Allo, Fürth (DE); Jürgen Breme, Heusweiler (DE); Heinz Müller, Merchweiler (DE); Jürgen Peter Turnsek, Völklingen (DE)

(73) Assignee: Endress + Hauser GmbH + Co., Maulburg (DE)

( * ) Notice: Subject to any disclaimer, the term of this patent is extended or adjusted under 35 U.S.C. 154(b) by 214 days.

(21) Appl. No.: 10/170,852

(22) Filed: Jun. 12, 2002

(65) Prior Publication Data

US 2002/0155020 A1 Oct. 24, 2002

Related U.S. Application Data

(62) Division of application No. 09/455,690, filed on Dec. 7, 1999, now Pat. No. 6,427,900, which is a continuation of application No. 08/896,481, filed on Jul. 18, 1997, now Pat. No. 6,039,918.
(60) Provisional application No. 60/023,079, filed on Aug. 2, 1996.

(30) Foreign Application Priority Data

Jul. 25, 1996 (EP) .............................................. 96111987

(51) Int. Cl.$^7$ .............................................. C22C 16/00
(52) U.S. Cl. ........................... 428/469; 73/718; 73/719; 420/422
(58) Field of Search .................... 73/700–756; 428/469; 420/422; 148/421; 228/121, 124.5

(56) References Cited

U.S. PATENT DOCUMENTS 3,038,249 A 6/1962 Gilliland et al.
3,104,972 A 9/1963 Droegkamp et al.
4,050,931 A 9/1977 Tanner et al.
4,064,757 A 12/1977 Hasegawa
5,351,938 A 10/1994 Hegner et al.
5,368,659 A 11/1994 Peker et al.
5,400,489 A 3/1995 Hegner et al.
5,431,744 A 7/1995 Breme et al.
5,589,012 A 12/1996 Hobby et al.

FOREIGN PATENT DOCUMENTS

DE 1175059 7/1964
DE 1201663 9/1965
GB 1094052 12/1965
RU 2009241 3/1954
WO WO 94/23078 10/1994

OTHER PUBLICATIONS

Fox, C. W. And Slaughter, G.M *Brazing of Ceramics*, Welding Journal, Jul., 1964, pp. 591–597.

Primary Examiner—George Wyszomierski
Assistant Examiner—Janelle Combs-Morillo
(74) Attorney, Agent, or Firm—Bose McKinney & Evans LLP

(57) ABSTRACT

The active brazing solder for brazing ceramic parts of alumina, particularly of high-purity alumina, contains a maximum of 12 wt. % Ti, a maximum of 8 wt. % Be, and less than 16.5 wt. % Fe, the remainder being Zr and any impurities that may be present. The active brazing solder has the following behaviour/features: Brazing temperature: lower than 1,000° C.; the brazed joint is high-vacuum-tight over a long period of time; the coefficient of thermal expansion of the active brazing alloy is substantially identical to that of the alumina ceramic in the entire temperature range covered during the brazing process; the strength of the brazed joint between the two ceramic parts is so high that under tensile loading, fracture will result not at the joint, but in the adjacent ceramic; the pressure resistance of the active brazing solder is greater than 2 GPa; the active brazing solder is very good processable into powders having particle sizes on the order of 10 µm.

10 Claims, 1 Drawing Sheet

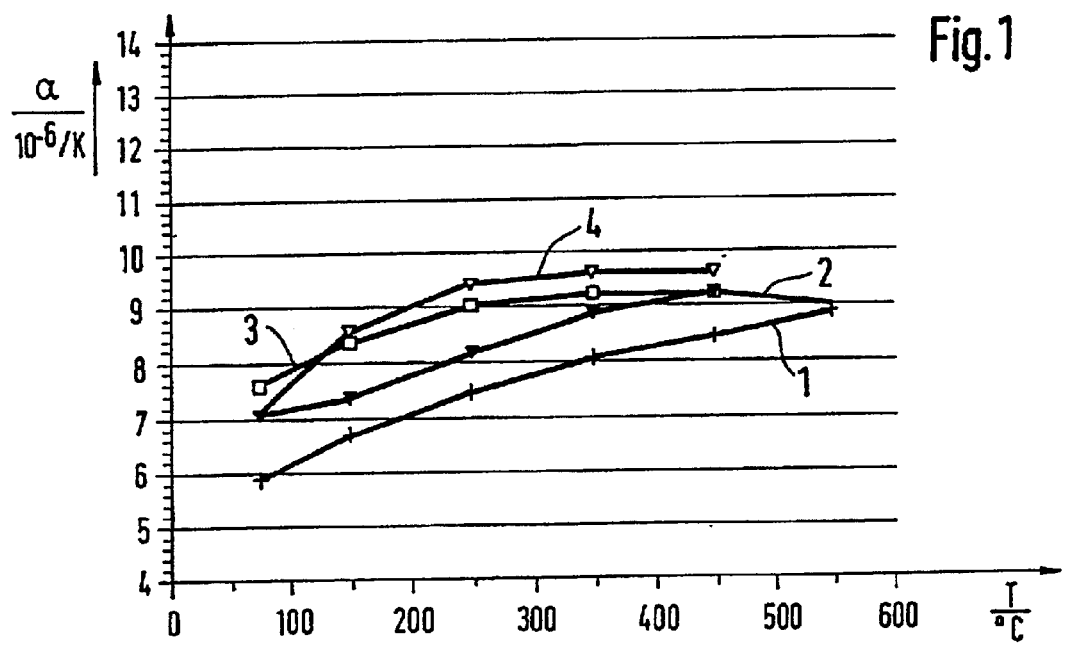
Fig. 1
Fig. 2
|  | $T_L$ / °C | $R_M$ / MPa |
|---|---|---|
| (ZrFe16.5Ti9)99Be1 | 960 | 38 |
| (ZrFe16.5Ti9)98Be2 | 920 | 116 |
| ZrTi10Be4 | 940 | 35 |
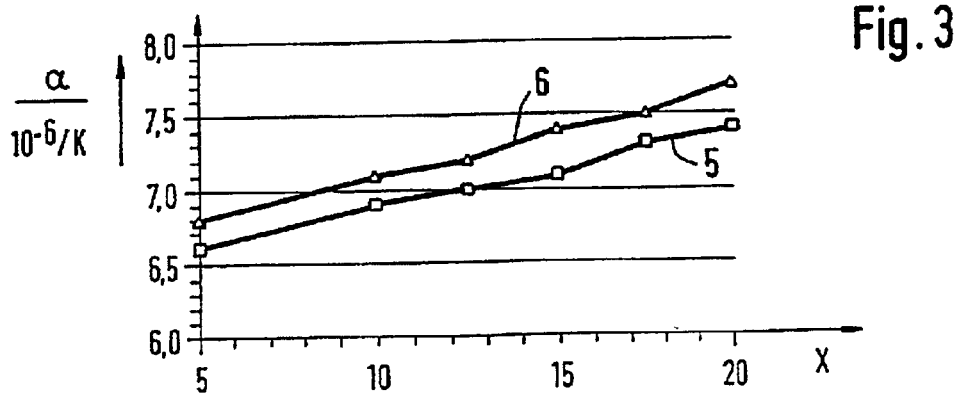
Fig. 3

ACTIVE BRAZING SOLDER FOR BRAZING ALUMINA-CERAMIC PARTS

This is a division of application Ser. No. 09/455,690, filed Dec. 7, 1999 now U.S. Pat. No. 6,427,900, which is a continuation of application Ser. No. 08/896,481 filed Jul. 18, 1997 now U.S. Pat. No. 6,039,918, which claims benefit of U.S. provisional application No. 60/023,079 filed Aug. 2, 1996.

FIELD OF THE INVENTION

The present invention relates to active brazing solders for brazing ceramic parts of alumina, particularly of high-purity alumina.

BACKGROUND OF THE INVENTION

Active brazing solders are alloys which contain at least one element having an affinity for oxygen, such as titanium. They attack the covalent or ionic bonding of the ceramic surfaces to be brazed, wet these surfaces, and thus unite chemically and mechanically with them. Therefore, brazing requires no fluxes whatsoever.

Part of these active brazing solders, if they are brittle and difficult to machine or unmachinable in the solidified condition, can be produced by melt-spinning in the form of thin strips, which can then be easily machined, e.g., stamped or cut.

Thus, shaped active brazing foil parts, such as rings, can be produced, which are placed between the ceramic parts to be brazed and are subsequently fused with the latter.

Part of the molten and solidified active brazing alloys may also be ground into powder and processed in this form into an active brazing paste, which can also be introduced between the ceramic parts, e.g., in the form of a ring, and subsequently fused with these parts.

When brazing ceramic parts of alumina, particularly of 99.9 percent, i.e., high-purity, alumina as is needed and used for capacitive or resistive ceramic pressure sensors, particularly absolute-pressure sensors, the active brazing solder must meet several requirements; in particular, it must have the following properties:

The temperature at which the sintered alumina ceramic is brazed, i.e., the brazing temperature, must be below 1000° C., preferably between 700° C. and 980° C.

The brazed joint must be high-vacuum-tight over a long period of time, so that a vacuum existing during the brazing process in the chamber of a pressure sensor, for example, which is closed by the brazing, will remain unchanged.

The coefficient of thermal expansion of the active brazing alloy should be identical to that of the alumina ceramic in the entire temperature range covered during the brazing process, so that only minimal stress will be developed during cooling from the brazing temperature to the ambient temperature.

The strength of the brazed joint between the two ceramic parts must be so high that under tensile loading, fracture will result not at the joint, but in the adjacent ceramic.

The pressure resistance of the active brazing solder must be at least 2 GPa (=2 Gigapascals).

An active brazing solder which meets these requirements should also be processable into the aforementioned active brazing pastes, since the melt-spinning process, if applicable, requires costly and complicated equipment, so that the active brazing foils produced therewith are expensive.

With active brazing solders such as the zirconium-nickel-titanium alloys described in U.S. Pat. No. 5,351,938 (in the following abbreviated, as usual, as ZrNiTi alloys) not all of the above-mentioned boundary conditions can be fulfilled in a completely satisfactory manner. In particular, the above-mentioned requirement that the coefficients of thermal expansion of the active brazing solder and the alumina should be identical over the entire temperature range is not met, this requirement being based on new knowledge gained by the inventors.

SUMMARY OF THE INVENTION

It was therefore necessary, and this is the problem underlying the invention, to look for compositions of active brazing solders which are different from those of the prior art zirconium-nickel-titanium alloys.

The invention provides an active brazing solder for brazing alumina-ceramic parts which contains a maximum of 12 wt. % titanium, a maximum of 8 wt. % beryllium, and less than 16.5 wt. % iron, the remainder being zirconium and any impurities that may be present.

In one preferred embodiment of the invention, the active brazing solder contains 8.6 wt. % titanium, 4 wt. % beryllium, and 15.8 wt. % iron.

In another preferred embodiment, the active brazing solder contains 8.8 wt. % titanium, 2 wt. % beryllium, and 16.2 wt. % iron.

In a further preferred embodiment, the active brazing solder contains 8.9 wt. % titanium, 1 wt. % beryllium, and 16.3 wt. % iron.

In still another preferred embodiment of the invention, the active brazing solder contains 10 wt. % titanium and 4 wt. % beryllium, but no iron.

An essential advantage of the active brazing solders according to the invention is that they can be ground finely with a higher yield than the ZrNiTi alloys described in the above-mentioned U.S. Pat. No. 5,351,938 using equipment of comparable complexity, and that the grinding under oxygen described in U.S. Pat. No. 5,431,744 can be used.

In the oxygen atmosphere, the melted, cooled, and uncrushed pieces of the active brazing alloys of the invention begin to disintegrate into a hydride powder of the alloy (particle diameter of the order of less than 300 μm) between 100° C. and 150° C. already at an absolute pressure of approximately 200 kPa (=200 kilopascals=2 bars). In a mill, e.g., a ball mill, this powder can be ground, under hydrogen overpressure and with little expenditure of energy, into powders with a desired mean particle size on the order of 10 μm, e.g., 12 μm. The hydrogen can be removed later during the brazing process.

The entire powder production process, namely hydrogenating, grinding, and screening, takes place in the absence of atmospheric oxygen. Grinding, storing, and packaging are carried out under hydrogen or inert-gas overpressure, so that air has no access. This ensures a low oxygen content in the powders, which have a high affinity for oxygen, so that one of the requirements for good brazing properties is met.

BRIEF DESCRIPTION OF THE DRAWINGS

The invention and further advantages will now be explained in more detail with reference to the accompanying drawing, in which:

FIG. 1 is a plot of the expansion coefficients of high-purity alumina and some active brazing solders according to the invention;

FIG. 2 shows various properties of preferred active brazing solders according to the invention in the form of a table; and FIG. 3 is a plot representing the effect of the iron content on the expansion coefficient of a zirconium-iron-titanium alloy.

DETAILED DESCRIPTION OF THE DRAWINGS

Referring to FIG. 1, measured values of the expansion coefficients a of high-purity alumina, i.e., 99.9% alumina, and of some active brazing solders according to the invention are plotted as a function of temperature in the range between approximately 100° C. and approximately 600° C. The ordinate represents the expansion coefficient α in $10^{-6}$/K, and the abscissa represents the temperature T in ° C.

Curve 1 shows the coefficient of thermal expansion of high-purity alumina. It runs between approximately $6 \cdot 10^{-6}$/K at approximately 100° C. and approximately $9 \cdot 10^{-6}$/K at approximately 550° C. with a slightly negative curvature.

Curve 2 shows the coefficient of thermal expansion of a zirconium-titantium-beryllium active brazing alloy with the composition ZrTi10Be4. This short notation means that the alloy contains 10 wt. % titanium (abbreviated: Ti), 4 wt. % beryllium (abbreviated: Be), and 86 wt. % zirconium (abbreviated: Zr).

Curve 2 runs between approximately $7 \cdot 10^{-6}$/K at approximately 100° C. and approximately $9 \cdot 10^{-6}$/K at approximately 550° C., with a slight maximum of approximately $9.2 \cdot 10^{-6}$/K at approximately 450° C.

Curve 3 shows the coefficient of thermal expansion of the zirconium-iron-titanium-beryllium active brazing alloy with the composition (ZrFe16.5Ti9)99Be1; this means that the alloy contains 1 wt. % beryllium and 99 wt. % of a constituent composed of 16.5 wt. % iron (abbreviated: Fe), 9 wt. % titanium, and 74.5 wt. % zirconium.

The expression in parentheses of (ZrFe16.5Ti9)99Be1 can be multiplied out, so that it can also be written as: ZrFe16.33Ti8.9Be1, i.e., 1 wt. % beryllium, 16.33 wt. % iron, 8.9 wt. % titanium, and 73.77 wt. % zirconium.

Curve 3 runs between approximately $7.5 \cdot 10^{-6}$/K at approximately 100° C. and approximately $9.2 \cdot 10^{-6}$/K at approximately 450° C., with a slight maximum of approximately $9.3 \cdot 10^{-6}$/K at approximately 350° C.

Curve 4 shows the coefficient of the thermal expansion of a zirconium-iron-titanium-beryllium active brazing alloy with the composition (ZrFe16.5Ti9)98Be2; this means that the alloy contains 2 wt. % beryllium and 98 wt. % of a constituent composed of 16.5 wt. % iron, 9 wt. % titanium, and 74.5 wt. % zirconium, or, again multiplied out, ZrFe16.17Ti8.8Be2, i.e., 1 wt. % beryllium, 16.17 wt. % iron, 8.8 wt. % titanium, and 73.03 wt. % zirconium.

Curve 4 runs between approximately $7 \cdot 10^{-6}$/K at approximately 100° C. and approximately $9.7 \cdot 10^{-6}$/K at approximately 350° C.

FIG. 1 shows that the expansion coefficient of the active brazing alloy ZrTi10Be4, which is represented by curve 2, comes closest to the expansion coefficient of high-purity alumina, and that in the temperature range shown, the expansion coefficient of the active brazing alloy differs from that of alumina by a substantially constant amount, which is only approximately $+0.8 \cdot 10^{-6}$/K.

According to the table of FIG. 2, however, at a brazing temperature $T_L$ of 940° C., this active brazing alloy ZrTi10Be4 has a tensile strength $R_M$ of approximately 35 MPa (=35 Megapascals), which is adequate in certain cases, but appears not yet suitable for the wide range of possible applications.

The highest value of the tensile strength $R_M$ together with the lowest value of the brazing temperature $T_L$ is achieved with the active brazing alloy (ZrFe16.5Ti9)98Be2 according to curve 4 of FIG. 1, namely a value of $R_M \approx 116$ MPa and a value of $T_L = 920°$ C.

In the temperature range in which pressure sensors are commonly used, the coefficient of thermal expansion of the active brazing alloy (ZrFe16.6Ti9)98Be2 is nearly equal to that of the active brazing alloy ZrTi10Be4.

To confirm a presumption on the part of the inventors that the aforementioned approximation of the coefficient of thermal expansion a to that of alumina is due to the iron content of the active brazing alloys, FIG. 3 shows the result of measurements made to determine this effect of iron. Zirconium-iron-titanium alloys of the composition ZrFe$_x$Ti10 were chosen, where the subscript x indicates the varying iron content during the measurements, again in wt. %.

Curve 5 of FIG. 3 shows the respective coefficient of thermal expansion between 50° C. and 200° C., and curve 6 shows the respective coefficient of expansion between 100° C. and 200° C. From the virtually constant slopes of curves 5 and 6 the inventors have drawn the conclusion that, if the iron content x becomes vanishingly small, the expansion coefficient α is smallest, namely approximately $6.3 \cdot 10^{-6}$/K.

This probably accounts for the fact that the values of the expansion coefficient of the iron-free alloy ZrTi10Be4 according to curve 2 of FIG. 1 are lower than those of the iron-containing alloys of curves 3 and 4 of FIG. 1.

What is claimed is:

1. A capacitive or resistive pressure sensor, comprising:

a first alumina-ceramic part;

a second alumina-ceramic part; and a brazed joint that unites said first alumina-ceramic part to said second alumina-ceramic part, said brazed joint formed from a brazing solder consisting essentially of 8.6 wt. % to 12 wt. % titanium, 1 wt. % to 8 wt. % beryllium, 0 wt. % to 16.5 wt. % iron, 63.5 wt. % to 90.4 wt. % zirconium, and a remainder being any impurities.

2. The pressure sensor of claim 1, wherein said active brazing solder has a melting point below 1000° C.

3. The pressure sensor of claim 1, wherein said active brazing solder has a melting point between 700° C. and 980° C.

4. The pressure sensor of claim 1, wherein said brazed joint was formed from an active brazing paste comprising said active brazing solder.

5. The pressure sensor of claim 1, wherein said active brazing solder consists essentially of about 10 wt. % titanium, about 4 wt. % beryllium, and about 86 wt. % zirconium.

6. The pressure sensor of claim 1, wherein said active brazing solder consists essentially of about 8.6 wt. % titanium, about 4 wt. % beryllium, about 15.8 wt. % iron, and about 71.6 wt. % zirconium.

7. The pressure sensor of claim 1, wherein said active brazing solder consists essentially of about 8.8 wt. % titanium, about 2 wt. % beryllium, about 16.2 wt. % iron, and about 73 wt. % zirconium.

8. The pressure sensor of claim 1, wherein said active brazing solder consists essentially of about 8.9 wt. % titanium, about 1 wt. % beryllium, about 16.3 wt. % iron, and about 73.8 wt. % zirconium.

9. The pressure sensor of claim 1, wherein said brazed joint has a pressure resistance of at least 2 Gigapascals.

10. The pressure sensor of claim 1, wherein said first ceramic part, said second ceramic part, and said brazed joint define a vacuum-tight chamber.

* * * * *

UNITED STATES PATENT AND TRADEMARK OFFICE
CERTIFICATE OF CORRECTION

PATENT NO. : 6,770,377 B2
DATED : August 3, 2004
INVENTOR(S) : Hegner et al.

It is certified that error appears in the above-identified patent and that said Letters Patent is hereby corrected as shown below:

<u>Title page,</u>
Item [75], please correct "Volker Güther, Sarrländer (DE)" to read
-- Volker Güther, Burgthann (DE) --

Signed and Sealed this

Fifth Day of April, 2005

JON W. DUDAS
*Director of the United States Patent and Trademark Office*